United States Patent
Wako

(10) Patent No.: US 7,326,436 B2
(45) Date of Patent: Feb. 5, 2008

(54) MAGNETIC RECORDING MEDIUM AND METHOD OF FABRICATING THE SAME

(75) Inventor: Hitoshi Wako, Miyagi (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 10/920,685

(22) Filed: Aug. 18, 2004

(65) Prior Publication Data

US 2005/0048322 A1 Mar. 3, 2005

(30) Foreign Application Priority Data

Aug. 25, 2003 (JP) ............... P2003-300303

(51) Int. Cl.
*B05D 5/12* (2006.01)
(52) U.S. Cl. ............ 427/127; 427/130; 427/131; 428/835.1
(58) Field of Classification Search ........... 427/127, 427/130, 131; 428/835.1
See application file for complete search history.

(56) References Cited

U.S. PATENT DOCUMENTS 6,913,780 B2 * 7/2005 Kato et al. ............ 427/8

2001/0031382 A1 * 10/2001 Kusakawa et al. .. 428/694 OTC

FOREIGN PATENT DOCUMENTS

| JP | 62-047483 | 3/1987 |
|---|---|---|
| JP | 06-136543 | 5/1994 |
| JP | 08-203059 | 8/1996 |
| JP | 2000-105916 | 4/2000 |
| JP | 2000-207735 | 7/2000 |

* cited by examiner

*Primary Examiner*—Alain L. Bashore
(74) *Attorney, Agent, or Firm*—Robert J. Depke; Rockey, Depke & Lyons LLC.

(57) ABSTRACT

The present invention is to provide a method of fabricating a magnetic recording medium capable of forming a protective layer with a stable performance even in a case where a thickness thereof is as thin as 100 nm or less, and a magnetic recording medium fabricated by the method. A magnetic recording medium is fabricated in the following manner, that is, a magnetic layer having a ferromagnetic metal thin film having a thickness as thin as 100 nm or less is formed on one main surface of a long non-magnetic support, and on the magnetic layer, a protective layer containing carbon is formed by the chemical vapor deposition process using an ion source equipped with a hollow cathode.

2 Claims, 4 Drawing Sheets

MAGNETIC RECORDING MEDIUM AND METHOD OF FABRICATING THE SAME

CROSS REFERENCES TO RELATED APPLICATIONS

The present document is based on Japanese Priority Document JP 2003-300303, filed in the Japanese Patent Office on Aug. 25, 2003, the entire contents of which being incorporated herein by reference.

BACKGROUND OF THE INVENTION

1. Field of the Invention

The present invention relates to a magnetic tape and a method of fabricating the same.

2. Description of Related Art

Conventionally, as magnetic recording tapes such as an audio tape, a video tape and so forth, a coating-type magnetic recording medium have widely been used, wherein a magnetic layer of which being formed by coating and drying a magnetic coating material, having a powdery magnetic material such as oxide magnetic powder, alloyed magnetic powder and so forth dispersed in an organic binder such as vinyl chloride/vinyl acetate-base copolymer, polyester resin, urethane resin, polyurethane resin and so forth, on a non-magnetic support.

On the other hand, for the purpose of application in data storage with an increasing demand on high-density magnetic recording, a magnetic recording medium of so-called, ferromagnetic metal film type has been proposed and has attracts public attention, wherein a magnetic layer of which being formed by directly depositing a ferromagnetic metal material such as Co—Ni-base alloy, Co—Cr-base alloy, Co—O or the like on a non-magnetic support such as polyester film, polyamide film, polyimide film or the like by a vacuum thin film forming process such as vacuum evaporation process, sputtering process, ion plating or the like, or by plating.

The above-described magnetic recording medium having a ferromagnetic metal thin film as the magnetic layer is excellent in coercive force, square ratio, and electro-magnetic conversion characteristics in the short-wavelength region, and is advantageous in many aspects, such as having an extremely small recording demagnetization and thickness loss during reproduction because the magnetic layer can be made extremely thin, and such as being successful in raising packing density of the magnetic material because there is no need of mixing a non-magnetic binder in the magnetic layer.

For the purpose of improving the electro-magnetic conversion characteristics and of obtaining a larger output of this sort of magnetic recording medium, there is also proposed an oblique evaporation by which the magnetic layer is obliquely deposited in the formation of the magnetic layer of the magnetic recording medium, and this has already been put into practical use as a magnetic tape for commercial video (8-mm, Hi-8 system, DV system) or professional-use video (DVCAM).

A magnetic tape, which is the above-described magnetic recording medium, is configured so that a magnetic layer typically composed of a ferromagnetic metal thin film formed by the oblique evaporation, and a protective layer for raising travel durability, composed of a carbon film called a diamond-like carbon (DLC) or a hydrogen-containing carbon film, and so forth are sequentially formed on a long non-magnetic support, and so that a lubricant layer, if necessary, is formed on the protective layer using a predetermined lubricant, and a back-coat layer is formed on the surface of the non-magnetic support opposite to that having the magnetic layer formed thereon.

Sputtering process and plasma CVD (chemical vapor deposition) process are techniques widely used for forming the protective layer, wherein the plasma CVD process has a larger opportunity of use in view of running durability and productivity.

In the formation of the protective layer applied with the plasma CVD process, a source gas is introduced into a vacuum chamber, an electrode is disposed so as to oppose with the magnetic layer deposited on the non-magnetic support, a plasma is excited by applying a high voltage between the electrode and magnetic layer to thereby decompose the source gas by the plasma, and to allow it to deposit as a DLC film on the magnetic layer.

Patent Document 1 describes a method of controlling film quality of thus-formed protective layer on the basis of a peak intensity (G) appeared at around 1,500 $cm^{-1}$ and a peak intensity (D) appeared at around 1,300 $cm^{-1}$ observed in Raman spectrometry, and a desirable range of D/G ratio.

In the above-described formation of the protective layer by the plasma CVD process, the magnetic layer deposited on the non-magnetic support is used as an electrode, wherein any changes in the film composition and thickness of the magnetic layer result in fluctuation in the voltage for exciting the plasma. Because properties of the carbon protective layer largely vary depending on the excitation voltage, it is difficult to obtain the same characteristics of the protective layer over the magnetic layers having different configurations. From another viewpoint of production, any compositional variation of the magnetic layer results in variation of the protective layer, and seriously degrades the productivity.

There is also a tendency towards a thinner thickness of the magnetic layer in association with increase in the recording density, and this tends to raise sheet resistance of the magnetic layer. The increase in the resistance of the magnetic layer makes it more difficult to apply a high voltage between the metal evaporated tape and the electrode.

The above-described event becomes distinct in particular for a thickness of the magnetic layer of 100 nm or less, and this substantially makes the film formation unavailable. FIG. 7 shows a graph plotting a thickness $t_{mag}$ of the magnetic layer on the abscissa, and plotting a ratio (D/G) of the peak intensity (G) appeared at around 1,500 $cm^{-1}$ and the peak intensity (D) appeared at around 1,300 $cm^{-1}$ observed in Raman spectrometry on the ordinate. The value D/G indicating the thickness of the protective layer varies with the thickness $t_{mag}$ of the magnetic layer, and a variable range for D/G can be altered by varying voltage applied to the magnetic layer and the electrode ($V_1$, $V_2$, for example), wherein the thickness $t_{mag}$ of the magnetic layer in a small region falls in a film unformable region $R_{imp}$ where voltage application is impossible, which typically corresponds to a region of the thickness of the magnetic layer of 100 nm or less.

Besides this, a method of forming a DLC film is also described typically in Patent Document 2.

[Patent Document 1]

Japanese Patent Application Publication No. 2000-207735.

[Patent Document 2]

Published Japanese Translations of PCT International Publication for Patent Applications No. 2002-541604.

SUMMARY OF THE INVENTION

A problem to be solved is that, in the formation of the protective layer on the magnetic layer, it becomes more difficult to form the protective layer having stable characteristics as the thickness of the magnetic layer becomes thinner.

A method of fabricating a magnetic recording medium of the present invention comprises the steps of forming, on one main surface of a long non-magnetic support, a magnetic layer having a ferromagnetic metal thin film; and forming, on the magnetic layer, a carbon-containing protective layer by the chemical vapor deposition process using an ion source equipped with a hollow cathode.

In the above-described method of fabricating a magnetic recording medium of the present invention, a magnetic layer having a ferromagnetic metal thin film is formed on one main surface of a long non-magnetic support, and on this layer, a carbon-containing protective layer is formed by the chemical vapor deposition process using an ion source equipped with a hollow cathode.

A magnetic recording medium of the present invention comprises a long non-magnetic support; a magnetic layer having a ferromagnetic metal thin film having a thickness of 100 nm or less, and formed on one surface of the non-magnetic support; and a carbon-containing protective layer formed on the magnetic layer by the chemical vapor deposition process using an ion source equipped with a hollow cathode.

The magnetic recording medium of the present invention has, as being formed on one main surface of the non-magnetic support, a magnetic layer having a ferromagnetic metal thin film having a thickness of 100 nm or less, and has, as being formed on this layer, a carbon-containing protective layer formed by the chemical vapor deposition process using an ion source equipped with a hollow cathode.

According to the method of fabricating a magnetic recording medium of the present invention, a protective layer is formed on the magnetic layer by the chemical vapor deposition process using an ion source equipped with a hollow cathode, and this makes it possible to form the protective layer stabilized in its property, even if the thickness of the magnetic layer is reduced to as thin as 100 nm or less.

The magnetic recording medium of the present invention is such as having the protective layer stabilized in its property even on the magnetic layer having a thickness reduced to as thin as 100 nm or less.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENT

The following paragraphs will describe modes of embodiment of the magnetic recording medium and the method of fabricating the same, referring to the attached drawings.

Figure 1:
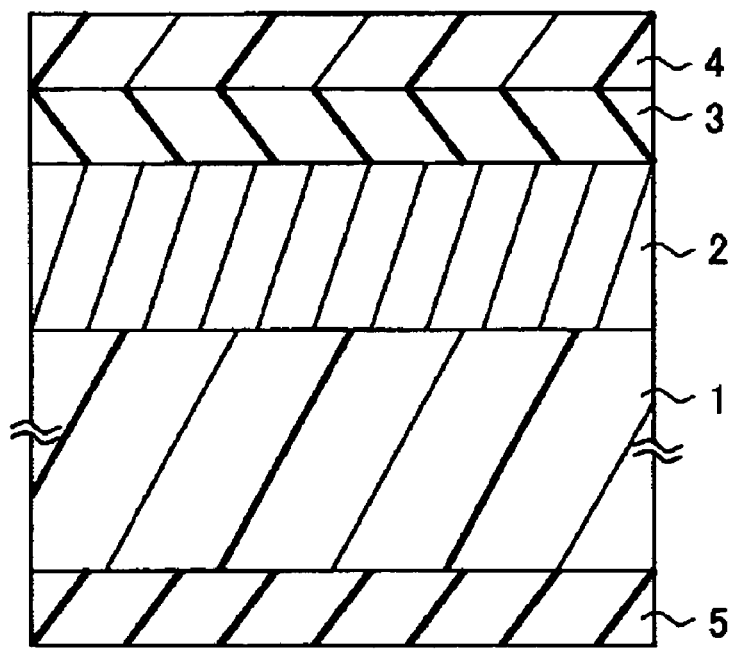
FIG. 1 is a cross-sectional view of a magnetic recording medium according to an embodiment of the present invention.

FIG. 1 is a schematic sectional view of the magnetic recording medium according to this embodiment. The magnetic recording medium is configured so that a magnetic layer 2 and a protective layer 3 are sequentially formed on a long non-magnetic support 1. The magnetic layer 2 comprises a ferromagnetic metal thin film. A lubricant layer 4 is formed on the magnetic layer 3 using a predetermined lubricant if necessary. On the surface of the non-magnetic support 1 opposite to that having the magnetic layer 2 formed thereon, a back-coat layer 5 is formed.

Materials for composing the non-magnetic support 1 include polyesters such as polyethylene terephthalate (PET) and polyethylene naphthalate (PEN); polyolefins such as polyethylene and polypropylene; cellulose derivatives such as cellulose triacetate; and plastics such as polycarbonate, polyimide, polyamide and polyamideimide.

The magnetic layer 2 is a ferromagnetic metal thin film having an orthorhombic columnar structure, typically formed by the vacuum thin film forming technique, and ferromagnetic metal materials for composing of the layer include Co—Ni-base alloy, Co—Cr-base alloy and Co—O for example, which are typically formed by an oblique evaporation using a vacuum evaporation apparatus.

The protective layer 3 is a layer provided for protecting the magnetic layer 2 from friction with a magnetic head, and is composed, for example, of a carbon film called diamond-like carbon (DLC) and a hydrogen-containing carbon film. The magnetic recording medium has been improved in the surface smoothness so as to suppress the spacing loss in response to an increasing trend in recording density, but the surface smoothness of the magnetic layer 2 increases friction force with the magnetic head due to increased contact area therewith, and consequently increases shearing force applied to the magnetic layer 2. The protective layer 3 is important to protect the magnetic layer 2 from this severe frictional condition.

In this embodiment, the protective layer 3 is a film formed by the chemical vapor deposition process using an ion source equipped with a hollow cathode. The chemical vapor deposition process using an ion source equipped with a hollow cathode (referred to as hollow cathode CVD process, hereinafter) will be described later.

The lubricant layer 4 plays an important role governing the durability and running property, and is typically formed by coating an arbitrary lubricant of perfluoropolyether base.

The back-coat layer 5 is provided for the purpose of raising the durability of the non-magnetic support 1, preventing scratching during the use, and reducing friction between the tapes, and is indispensable in view of raising the travel performance and durability. The back-coat layer 5 is typically formed by coating a back-coat layer coating material obtained by dispersing solid particles such as inorganic pigment into a binder and kneaded together with an organic solvent adapted to the binder. In another case, a DLC film formed by the sputtering process using carbon as a target is used as the back-coat layer.

It is still also allowable to dispose a magnetic layer underlying layer formed under the magnetic layer 2, and a back-coat underlying layer formed under the back-coat layer 5, if necessary.

According to the magnetic recording medium of this embodiment, the protective layer is a carbon-containing layer formed by the chemical vapor deposition process using an ion source equipped with a hollow cathode, and the magnetic recording medium is configured so as to have the protective layer with stable properties even if the thickness of the magnetic layer is reduced to as thin as 100 nm or below.

The magnetic recording medium according to this mode of embodiment is fabricated as described below. First, the magnetic layer 2 having a ferromagnetic metal thin film is formed on one main surface of the long non-magnetic support 1 typically by the oblique evaporation. Next, on the magnetic layer 2, the carbon-containing protective layer 3 comprising a carbon film called diamond-like carbon (DLC) or a hydrogen-containing carbon film is formed by the hollow cathode CVD process. The lubricant layer 4 is formed further on the protective layer 3, and the back-coat layer 5 is formed on the opposite main surface of the non-magnetic support 1, and thereby the magnetic recording medium shown in FIG. 1 is fabricated.

Figure 2:
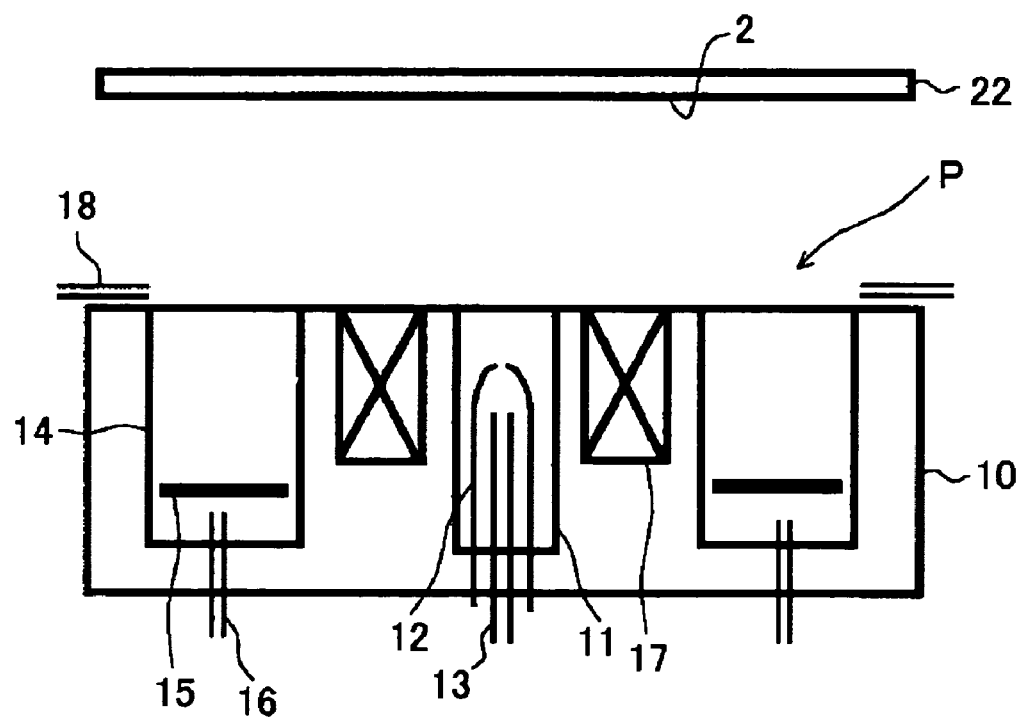
FIG. 2 is a view showing a schematic configuration of an ion source equipped with a hollow cathode, used in a hollow cathode CVD apparatus.

The above-described hollow cathode CVD process will be explained. FIG. 2 is a schematic configuration drawing showing an ion source equipped with a hollow cathode used for the above-described hollow cathode CVD apparatus. The ion source 10 has a hollow cathode unit 11, an electrode 12, a gas introducing pipe 13, an anode unit 14, an anode electrode 15, a gas introducing pipe 16, an electromagnet 17 and a source gas supply pipe 18.

The hollow cathode ion source 10 has a cylindrical shape, and has the hollow cathode unit 11 placed in the center portion thereof. The electrode 12 and the gas introducing pipe 13 for introducing Ar or other gases are disposed inside the hollow cathode unit 11. The anode unit 14 having an annular form is disposed in an area surrounding the hollow cathode unit 11. The anode electrode 15 and the gas introducing pipe 16 for introducing Ar or other gases are disposed at the bottom portion of the anode unit 14. The electromagnet 17 is disposed between the hollow cathode unit 11 and the anode unit 14.

In the hollow cathode unit 11 at the center, high voltage is applied to the electrode 12 while introducing Ar gas through the gas introducing pipe 13 to thereby activate electric discharge, and the anode electrode 15 is set to a potential higher than that of the hollow cathode unit 11 while introducing Ar gas through the gas introducing pipe 16 so as to activate electric discharge between the hollow cathode unit 11 and the anode electrode 15, and thereby a plasma P is formed in the vicinity of the surface of the ion source 10. Magnetization of the electromagnet 17 herein is successful in raising density of the plasma P.

When the source gas is supplied through the source gas supply tube 18 disposed on the outer side of the anode unit 14, the source gas is decomposed in the plasma P. A portion of electrons supplied from the hollow cathode unit 11 go towards the magnetic layer 2 of a support 22 having the magnetic layer 2 formed thereon, and the source gas ionized in the plasma P is accelerated towards the direction of the magnetic layer 2, and deposits thereon.

Figure 3:
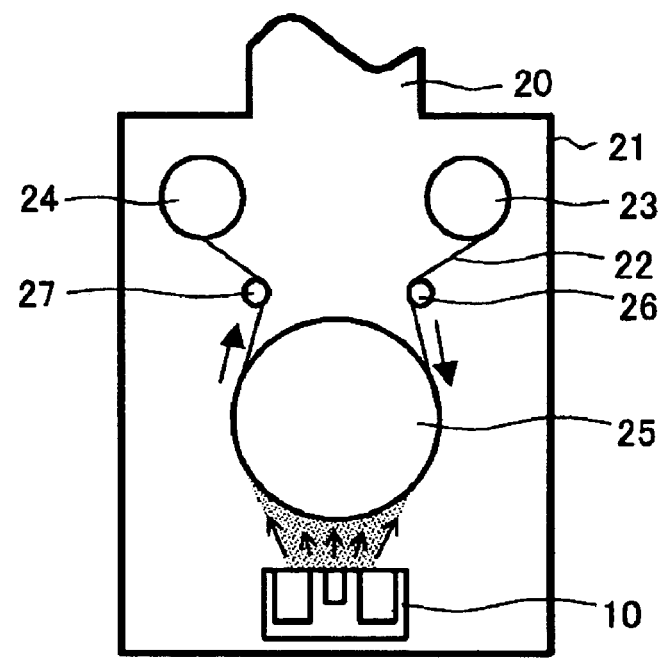
FIG. 3 is a view showing a schematic configuration of the hollow cathode CVD apparatus using the ion source equipped with the hollow cathode.

FIG. 3 is a schematic configuration drawing of a hollow cathode CVD apparatus using the ion source equipped with the hollow cathode shown in FIG. 2. The CVD apparatus has an evacuation system 20, a vacuum chamber 21, a feed roll 23, a winding roll 24, a cooling can 25, guide rolls (26, 27), and the hollow cathode ion source 10.

The feed roll 23 which rotates in the clockwise direction in the drawing and the winding roll 24 which rotates again in the clockwise direction in the drawing are disposed in the vacuum chamber 21 kept at a high degree of vacuum with the aid of the evacuation system 20 disposed at the top portion thereof, and the support 22 having the magnetic layer is arranged to successively travel from the feed roll 23 to the winding roll 24.

In the middle way along which the support 22 having the magnetic layer travels from the feed roll 23 to the winding roll 24, the cooling can 25 having a diameter larger than those of the feed roll 23 and the winding roll 24 is disposed. The cooling can 25 is disposed so as to draw the support 22 having the magnetic layer downward in the illustration, and configured so as to rotate clockwisely in the illustration at a constant speed. It is to be noted that each of the feed roll 23, the winding roll 24 and the cooling can 25 have a cylindrical form having a length almost equivalent to the width of the support 22 having the magnetic layer.

The support 22 having the magnetic layer is, therefore, arranged so as to be successively reeled out from the feed roll 23, pass over the circumferential surface of the cooling can 25, and be taken up by the winding roll 24. It is to be noted that the guide rolls 26, 27 are disposed respectively between the feed roll 23 and the cooling can 25, and between the cooling can 25 and the winding roll 24, so as to apply a predetermined tension to the support 22 having the magnetic layer which travels from the feed roll 23 via the cooling can 25 to the winding roll 24, so that the support 22 having the magnetic layer can smoothly run.

In the vacuum chamber 21, the hollow cathode ion source 10 is disposed below the cooling can 25. The hollow cathode ion source 10 generates plasma as described in the above, decomposes and ionizes the source gas, and this allows successive film formation of the DLC film or the like on the running support 22 having the magnetic layer.

Unlike the plasma CVD process adopted in the prior art, the above-described hollow cathode CVD process does not use the magnetic layer, evaporated on the non-magnetic support, as an electrode. Voltage for exciting the plasma, therefore, does not fluctuate even if the film composition and thickness of the magnetic layer should vary, and this makes it possible to form the protective layer having stable characteristics.

Figure 4:
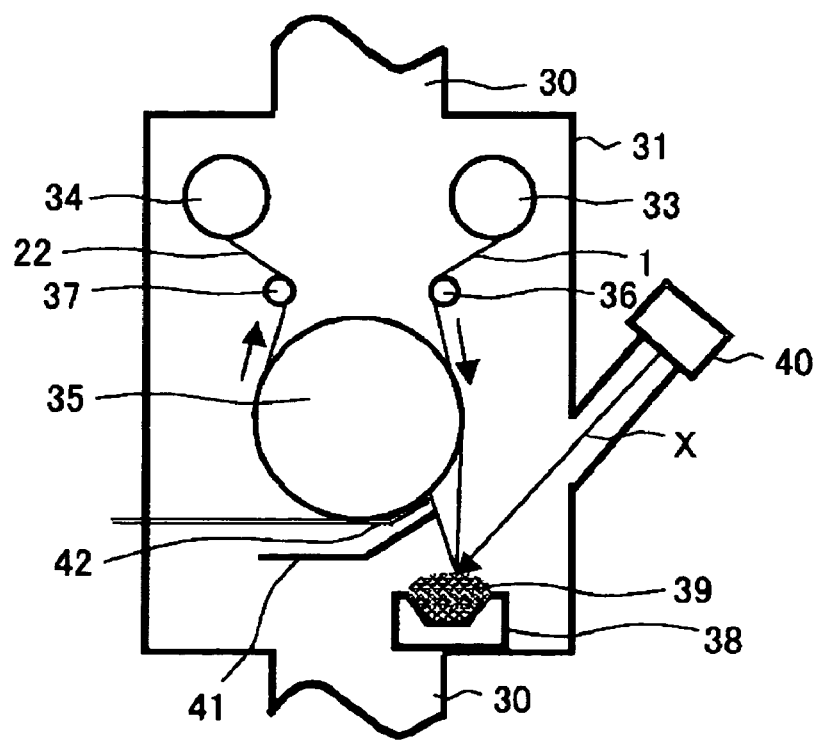
FIG. 4 is a view showing a schematic configuration drawing of a vacuum evaporation apparatus.

The next paragraphs will explain the oblique evaporation for forming the magnetic layer. FIG. 4 is a schematic sectional view showing a vacuum evaporation apparatus for carrying out the oblique evaporation. The vacuum evaporation apparatus has evacuation systems 30, a vacuum chamber 31, a feed roll 33, a winding roll 34, a cooling can 35, guide rolls 36, 37, a crucible 38, a metal magnetic material 39, an electron gun 40, a shutter 41 and an oxygen gas introducing pipe 42.

The feed roll 33 which rotates in the clockwise direction in the illustration and the winding roll 34 which rotates again in the clockwise direction in the illustration are disposed in the vacuum chamber 31 kept at a high degree of vacuum with the aid of the evacuation systems 30 disposed respectively at the top and bottom portions thereof, and the tape-formed non-magnetic support 1 is arranged to successively run from the feed roll 33 to the winding roll 34.

In the middle way along which the non-magnetic support 1 runs from the feed roll 33 to the winding roll 34, the cooling can 35 having a diameter larger than those of the feed roll 33 and the winding roll 34 is disposed. The cooling can 35 is disposed so as to draw the non-magnetic support 1 downward in the illustration, and configured so as to rotate clockwisely in the illustration at a constant speed. It is to be noted that each of the feed roll 33, the winding roll 34 and the cooling can 35 have a cylindrical form having a length almost equivalent to the width of the non-magnetic support 1, and the cooling can 35 has a not-shown cooling device incorporated therein, so as to make it possible to suppress any deformation of the non-magnetic support 1 due to temperature rise.

The non-magnetic support 1 is arranged so as to be successively reeled out from the feed roll 33, pass over the circumferential surface of the cooling can 35, and be taken up by the winding roll 34. It is to be noted that the guide rolls 36, 37 are disposed respectively between the feed roll 33 and the cooling can 35, and between the cooling can 35 and the winding roll 34, so as to apply a predetermined tension to the non-magnetic support 1 which runs from the unwinding roll 33 via the cooling can 35 to the winding roll 34, so that the non-magnetic support 1 can smoothly travel.

In the vacuum chamber 31, the crucible 38 is disposed below the cooling can 35, and the metal magnetic material 39 is placed in the crucible 38. The crucible has a width almost equivalent to that of the cooling can 35.

On the side wall portion of the vacuum chamber 31, the electron gun 40 for heating and evaporating the metal magnetic material 39 placed in the crucible 38 is attached. The electron gun 40 is positioned so that an electron beam X emitted therefrom can irradiate the metal magnetic material 39 in the crucible 38. The metal magnetic material 39 evaporated by the electron gun 40 is arranged to deposit and form a film as the magnetic layer on the non-magnetic support 1 traveling at a constant speed on the circumferential surface of the cooling can 35.

The shutter 41 is disposed between the cooling can 35 and the crucible 38, in the vicinity of the cooling can 35. The shutter 41 is formed so as to cover a predetermined area of the non-magnetic support 1 traveling at a constant speed on the circumferential surface of the cooling can 35, and by this shutter 41, the metal magnetic material 39 is allowed to deposit obliquely on the non-magnetic support 1 within a predetermined angular range (e.g., angle of incidence of 45° to 90°). During the vacuum evaporation, oxygen gas is supplied to the surface of the non-magnetic support 1 through the oxygen gas introducing pipe 42 disposed so as to penetrate the side wall portion of the vacuum chamber 31, aiming at improving magnetic characteristics and durability of the magnetic layer to be deposited.

According to the method of fabricating a magnetic recording medium of this mode of embodiment, in the process step of forming the protective layer, the carbon-containing protective layer is formed by the chemical vapor deposition process using the ion source equipped with the hollow cathode. The chemical vapor deposition process using the ion source equipped with the hollow cathode does not use the magnetic layer as an electrode, unlike the conventional plasma CVD process, and makes it possible to form the protective layer having stable characteristic even if the thickness of the magnetic layer is reduced to as thin as 100 nm or less.

EXAMPLE 1

Next, a magnetic recording medium (magnetic tape) of Example 1 was fabricated according to this embodiment, and subjected to the test below. First, on a base film (polyethylene terephthalate, thickness: 8 μm, width: 150 mm) as the non-magnetic support, the magnetic layer was formed by the oblique evaporation process using the vacuum evaporation apparatus under the vacuum evaporation conditions described below:

Vacuum Evaporation Conditions for Magnetic Layer:
Ingot (metal magnetic material): Co, 100 wt %
Angle of incidence: 45° to 90°
Introduced gas: oxygen gas
Amount of introduced oxygen: $4.4 \times 10^{-6}$ m$^3$/sec
Degree of vacuum during vacuum evaporation: $2 \times 10^{-2}$ Pa
Thickness of magnetic layer: 45 nm Next, the support having the magnetic layer formed thereon was taken out from the vacuum evaporation apparatus, loaded on the feed roll side of the hollow cathode CVD apparatus, and subjected to formation of the DLC film as the protective layer under the conditions for CVD using the ion source equipped with the hollow cathode, as described below:

Formation Conditions for Protective Layer:
Ar flow rate around hollow cathode: 20 sccm
Ar flow rate around anode: 40 sccm
Source gas: $C_2H_4$
Flow rate of source gas: 30 sccm
Process pressure: 1 mTorr
Discharge voltage: 50 V
Thickness of protective layer: 2 nm Next, a back-coat composition having a chemical composition shown below was put in a ball mill, allowed to disperse and mix for 24 hours, added with a crosslinking agent to thereby prepare a back-coat coating material, and this was coated on the surface of the non-magnetic support opposite to the magnetic layer to thereby form the back-coat layer of 0.6 μm thick.

Back-Coat Composition:
Carbon black: 50 wt %
Polyurethane resin: 50 wt %

The master tape sheet having the magnetic layer, the protective layer and the back-coat layer thus formed thereon was slit into 3.8-mm width to thereby fabricate sample tapes (Example 1) of the magnetic recording medium.

EXAMPLES 2, 3, AND COMPARATIVE
EXAMPLES 1 TO 4

Magnetic tapes of Examples 2 and 3, and Comparative Examples 1 to 4 were fabricated under the discharge voltage and thickness of the protective layer altered into various values as listed below in the process step of forming the protective layer by the hollow cathode CVD process. It is to be noted that the thickness of the protective layer can be altered by the feed speed of the support.

Example 1

Discharge voltage 50 V,
Thickness of protective layer 2 nm

Example 2

Discharge voltage 120 V,
Thickness of protective layer 8 nm

Example 3

Discharge voltage 80 V,
Thickness of protective layer 16 nm

Comparative Example 1

Discharge voltage 80 V,
Thickness of protective layer 1 nm

Comparative Example 2

Discharge voltage 80 V,
Thickness of protective layer 18 nm

Comparative Example 3

Discharge voltage 150 V,
Thickness of protective layer 8 nm

Comparative Example 4

Discharge voltage 180 V,
Thickness of protective layer 4 nm

In the fabrication of above-described Examples 1 to 3 and Comparative Examples 1 to 4, any alteration of the discharge voltage and thickness into various values never resulted in any unstable discharge situation such as arc discharge during the film formation, and instead resulted in stable film formation. On the contrary, the film formation under similar conditions by the conventional plasma CVD process failed in maintaining the discharge because of a thickness of the magnetic layer as thin as 45 nm.

(Raman Spectrometry)

Raman scattering measuring apparatus generally comprises four sections, which are an excitation light source, a sample unit, a dispersion system and a detector. Ion gas (Ar, He—Ne, Kr) laser is used for the excitation light. The sample unit comprises optical systems for sample irradiation and concentration of scattered light. Raman scattered light is dispersed by a double monochrometer in which single spectrophotometers are connected in series, and then detected by the detector. Photomultiplier tube has been used for the detector, but multi-channel photodetector has increasingly been used in recent years. The multi-channel photodetector can measure spectrum at the same time, and this advantageously needs only several seconds for the measurement.

The individual samples (Examples 1 to 3, and Comparative Examples 1 to 4) were tested by Raman spectrometry. The ratio (D/G) of the spectral intensity (G) having a peak from 1,550 cm$^{-1}$ to 1,650 cm$^{-1}$ and the spectral intensity (D) having a peak from 1,350 cm$^{-1}$ to 1,450 cm$^{-1}$ in Raman spectrum was investigated.

(Practical Performance Test)

The individual samples (Examples 1 to 3, and Comparative Examples 1 to 4) were subjected to a head wear test and an electromagnetic conversion characteristic test, as evaluations for practical performance. In the head wear test, the amount of wear of an MR head was measured by carrying out 60-min shuttle run for 300 times on Micro MV camcorder (product of SONY Corporation) under a −5° C. environment. The amount of head wear was found to seriously affect the electromagnetic conversion characteristic when it exceeded 1 μm, so that it was found necessary to suppress the wear to 1 μm or less.

The electromagnetic conversion characteristic test was also carried out using a drum tester. Recording was carried out at recording wavelengths of 2.0 μm and 0.3 μm, using an MIG head having a gap length of 0.22 μm and a track width of 20 μm, and carrier output obtained when reproduction was made using an NiFe MR head having a track width of 5 μm was measured. The measurement was respectively made while allowing the magnetic tape and magnetic head relatively move in the normal direction and inverse direction, and an average value was found. Relative speed of the magnetic tape and the MR head was set to 7 m/sec. The carrier output was expressed in dB assuming Example 2 as a reference. It is to be understood that a carrier output of −3 dB or less is not a signal appropriate for the recording/reproduction system.

The D/G ratio respectively measured by Raman spectrometry, and results of the head wear test and the electromagnetic conversion characteristic test were shown in Table 1.

TABLE 1

| | Discharge Voltage | Thickness of Protective Layer | D/G | Amount of Head Wear | Electromagnetic Conversion Characteristic |
|---|---|---|---|---|---|
| Example 1 | 50 V | 2 nm | 0.2 | 0.1 μm | +2.2 dB |
| Example 2 | 120 V | 8 nm | 1.0 | 0.7 μm | 0.0 dB |
| Example 3 | 80 V | 16 nm | 0.6 | 0.8 μm | −2.7 dB |
| Comparative Example 1 | 80 V | 1 nm | 0.6 | 0.1 μm | Not Measurable (scratch) |
| Comparative Example 2 | 80 V | 18 nm | 0.6 | 1.2 μm | −3.7 dB |
| Comparative Example 3 | 150 V | 8 nm | 1.2 | 1.3 μm | +0.2 dB |
| Comparative Example 4 | 180 V | 4 nm | 1.5 | 1.2 μm | +1.2 dB |

As is obvious from Table 1, the magnetic recording medium is successfully given with a small head wear property and sufficient output signal by forming the carbon protective layer to a thickness of 2 to 16 nm using the hollow cathode CVD process, and by adjusting the ratio of intensity of a spectrum having a peak from 1,550 cm$^{-1}$ to 1,650 cm$^{-1}$ and intensity of a spectrum having a peak from 1,350 cm$^{-1}$ to 1,450 cm$^{-1}$ to 1.0 or below.

Figure 5:
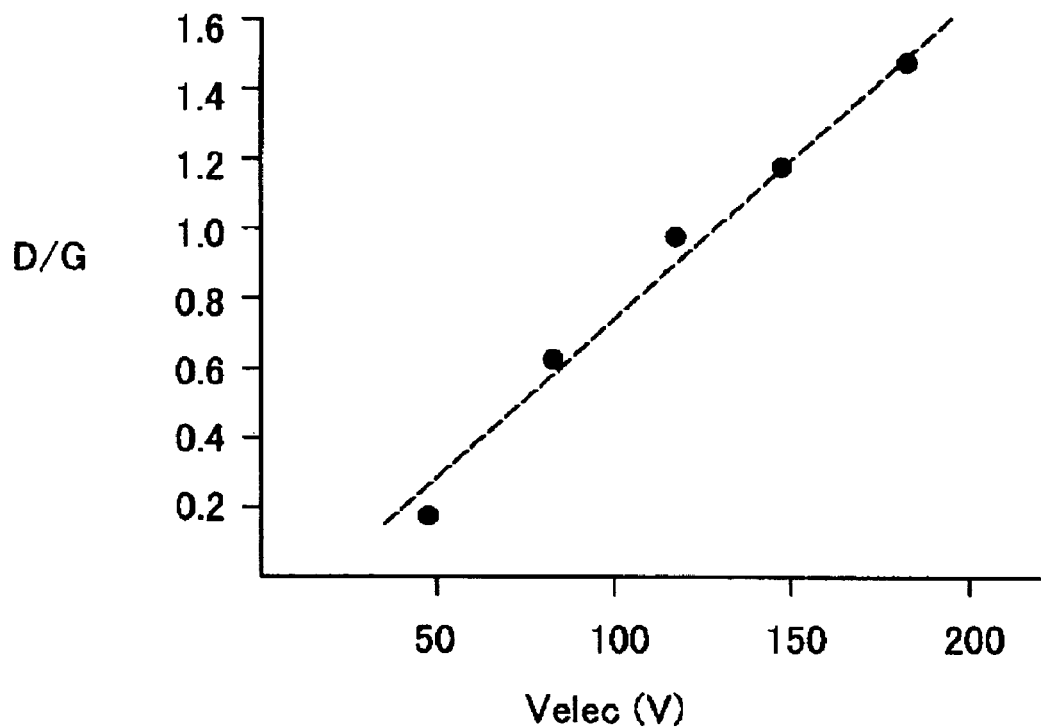
FIG. 5 is a graph obtained by plotting a D/G ratio with respect to a discharge voltage.

FIG. 5 is a graph obtained by plotting D/G ratio with respect to discharge voltage $V_{elec}$ based on Table 1. The D/G ratio strongly correlates to the discharge voltage, wherein a higher discharge voltage results in a smaller D/G ratio. The D/G ratio is preferably 1.0 or less as descried in the above, and to realize this, it is preferable to set the discharge voltage, under the above-described conditions in the hollow cathode CVD process, to 120 V or less.

Figure 6:
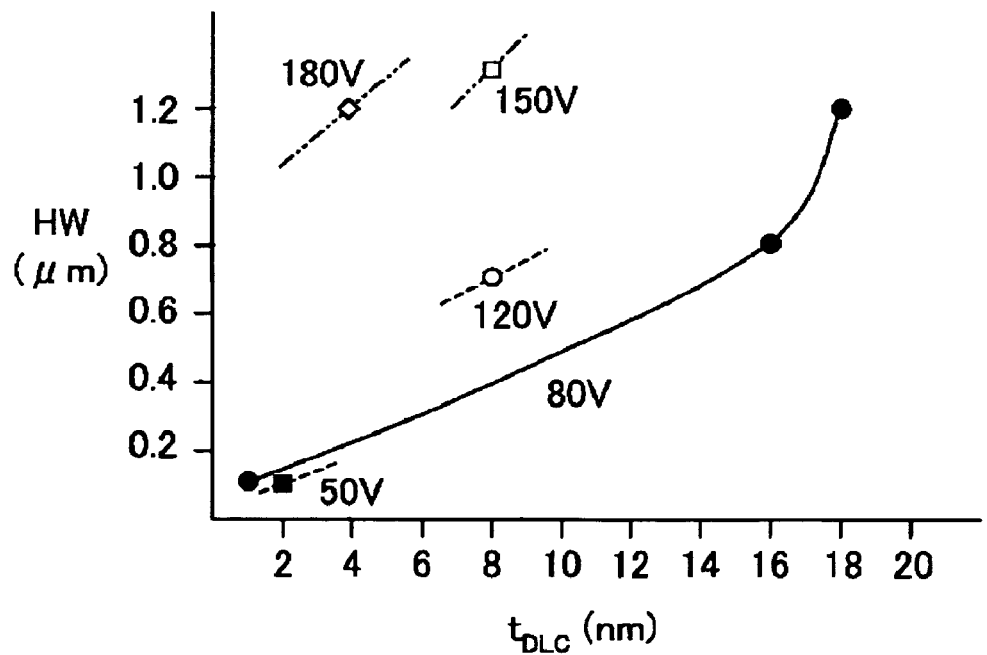
FIG. 6 is a graph obtained by plotting an amount of head wear in Examples with respect to a thickness of a protective layer (DLC)
Figure 7:
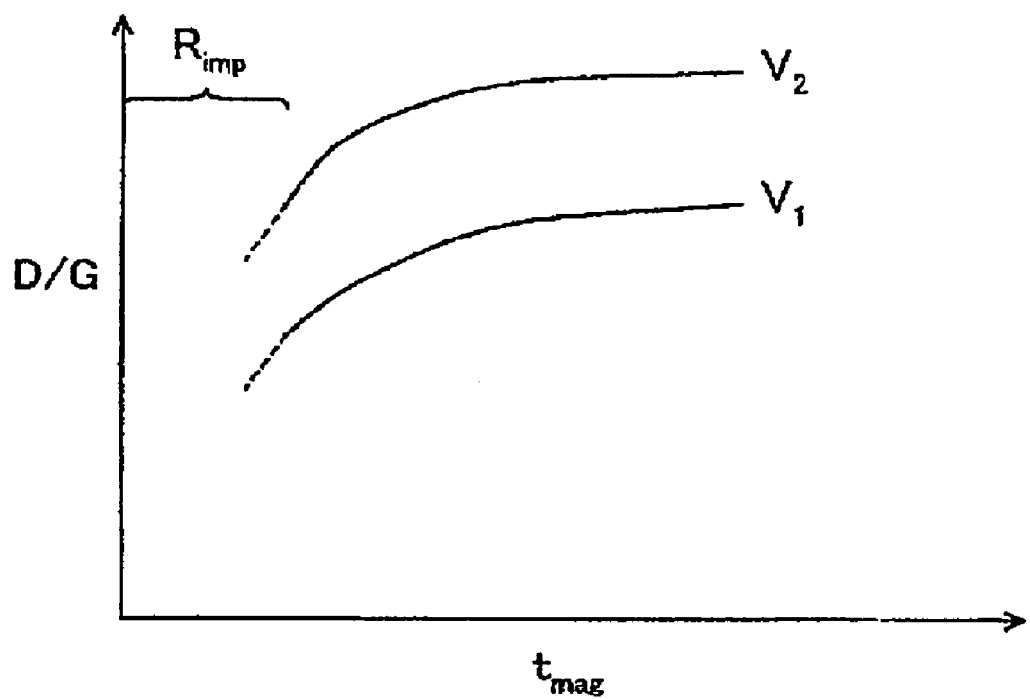
FIG. 7 is a graph obtained by plotting the D/G ratio in Raman spectrum of the protective layer with respect to a thickness of a magnetic layer, in the formation of the protective layer by a conventional plasma CVD process.

FIG. 6 is a graph obtained by plotting the amount of head wear HW with respect to a thickness $t_{DLC}$ of the protective layer (DLC layer film). Numerals given in the graph indicate the discharge voltage. It is found from the graph that the amount of head wear increases as the thickness of the protective layer (DLC film) increases, and as the discharge voltage increases. Because the amount of head wear is preferably suppressed to 1.0 μm or less as described in the above, ranges of the thickness of the protective layer and the discharge voltage can be determined depending on FIG. 6.

It was made possible to carry out a stable film formation by using the hollow cathode CVD process even on a magnetic tape having a thin magnetic layer, which has been difficult in the prior art. Use of the hollow cathode CVD process made it possible to improve stability in the film formation, to form the film for a long duration of time, and to improve the yield ratio. Use of the hollow cathode CVD process can realize arbitrary film quality of the protective layer.

The magnetic recording medium and the method of fabricating the same according to the present invention are by no means limited to the description in the above. For example, although the medium of the above-described mode of embodiment has the DLC film as the protective layer, the protective layer may have any other characteristics such as composition, thickness and film quality. Also the layer configuration and so forth of the magnetic recording medium is by no means limited to those exemplified in the mode, and various layers such as a magnetic layer underlying layer and a back-coat underlying layer may be provided. Any other modifications may be allowable without departing from the spirit of the present invention.

The magnetic recording medium and the method of fabricating the same are applicable to magnetic tape for data storage, and a method for fabricating the same.

Although the invention has been described in its preferred form with a certain degree of particularity, obviously many changes and variations are possible therein. It is therefore to be understood that the present invention may be practiced otherwise than as specifically described herein without departing from the scope and the spirit thereof.

What is claimed is:

1. A method of fabricating a magnetic recording medium, comprising the steps of:

forming, on one main surface of a non-magnetic support, a magnetic layer having a ferromagnetic metal thin film; and forming, on the magnetic layer, a carbon-containing protective layer by the chemical vapor deposition process using an ion source equipped with a hollow cathode, and wherein in said step of forming said protective layer, the protective layer is formed to have a thickness of 2 nm to 16 nm and the protective layer is formed to have a ratio (D/G) of an intensity (G) having a peak of 1,550 $cm^{-1}$ or more and 1,650 $cm^{-1}$ or less and an intensity (D) having a peak of 1,350 $cm^{-1}$ or more and 1,450 $cm^{-1}$ or less in Raman scattering spectrum being 1.0 or less.

2. The method of fabricating a magnetic recording medium according to claim 1, wherein, in said step of forming said magnetic layer, the magnetic layer is formed to have a thickness of 100 nm or less.

* * * * *